(12) United States Patent
Chan et al.

(10) Patent No.: US 6,230,160 B1
(45) Date of Patent: May 8, 2001

(54) CREATING PROXIES FOR DISTRIBUTED BEANS AND EVENT OBJECTS

(75) Inventors: Victor Shih-Chuan Chan, Thornhill; Paul Kwong-Hung Yu, Toronto, both of (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/116,836

(22) Filed: Jul. 16, 1998

(30) Foreign Application Priority Data

Jul. 17, 1997 (CA) .................................................. 2210755

(51) Int. Cl.[7] .................................................... G06F 17/00
(52) U.S. Cl. ........................................... 707/103; 707/102
(58) Field of Search .................................. 707/100–104, 707/200–206, 3–6, 7–10; 709/315, 201–223

(56) References Cited

U.S. PATENT DOCUMENTS

| 5,457,797 | 10/1995 | Butterworth et al. | 395/650 |
| 5,995,753 | * 11/1999 | Walker | 707/103 |
| 6,009,432 | * 12/1999 | Tarin | 707/103 |
| 6,044,217 | * 3/2000 | Brealey et al. | 707/104 |
| 6,049,819 | * 4/2000 | Buckle et al. | 707/10 |

OTHER PUBLICATIONS

Canadian Patent Application Serial No. 2,165,893, "Visual Application Partitioning for Creating Distributed Object Oriented Applications," (CA995–014).

M. Shapiro, "Structure and Encapsulation of Distributed Systems: The Proxy Principle," proceedings of Sixth International Conference of Distributed Computer Systems, May 1986, pp. 198–204.

"Introduction to OSF™ DCE," 1992, of Open Software Foundation.

A. DeSota, "Using the Beans Development Kit 1.0," Sun JavaBean Tutorial, Sep. 1997.

(List continued on next page.)

*Primary Examiner*—Thomas Black
*Assistant Examiner*—David Jung
(74) *Attorney, Agent, or Firm*—Steven W. Roth

(57) ABSTRACT

The invention provides a mechanism for distributing objects from a object oriented framework that permits method invocation and state information notification, such as event notification in a JavaBeans software component model. A code generation tool generates code from an existing server object that contains only application domain specific logic, to support deployment of the server object on a remote machine in a distributed application. The generated code includes a proxy class to reside locally with a client program that might invoke methods on the server object or receive notification of state information (events) from the server object, and a proxy class to be remotely deployed with the server object. The proxies created provide all the middleware specific logics. More importantly, the proxy on the client side contains all of the public methods, properties and event interfaces of the server object, so that a client program using this proxy can invoke the server object's methods and register to receive notification of state information on the proxy as if it were interacting locally with the server object. A proxy on the server side communicates the client program's method invocations and registrations to receive event notifications to the server object as if this proxy were a local client. When an event notification is issued by the server object, it is received by the proxy on the client side which transmits the notification through the middleware of the distributed application to the proxy on the client side. The proxy on the client side overrides the identification of the source of the notification, substituting itself, to receive any requests for data on the state information from the client program, but then delegates such requests to the object containing the state information to be fulfilled.

6 Claims, 11 Drawing Sheets

OTHER PUBLICATIONS

Sun's JavaBeans API Sepcification, Version 1.01, Jul. 24, 1997.

http://java.sun.com/products/javabeans, Dec. 2000.* http://www.lovedahl.com, Dec. 2000.* wysiwyg://idgnet_main.103/http://archive . . . bin/display/Archive/pl?/97/6/t07–06.6.htm, Dec. 2000.*

* cited by examiner

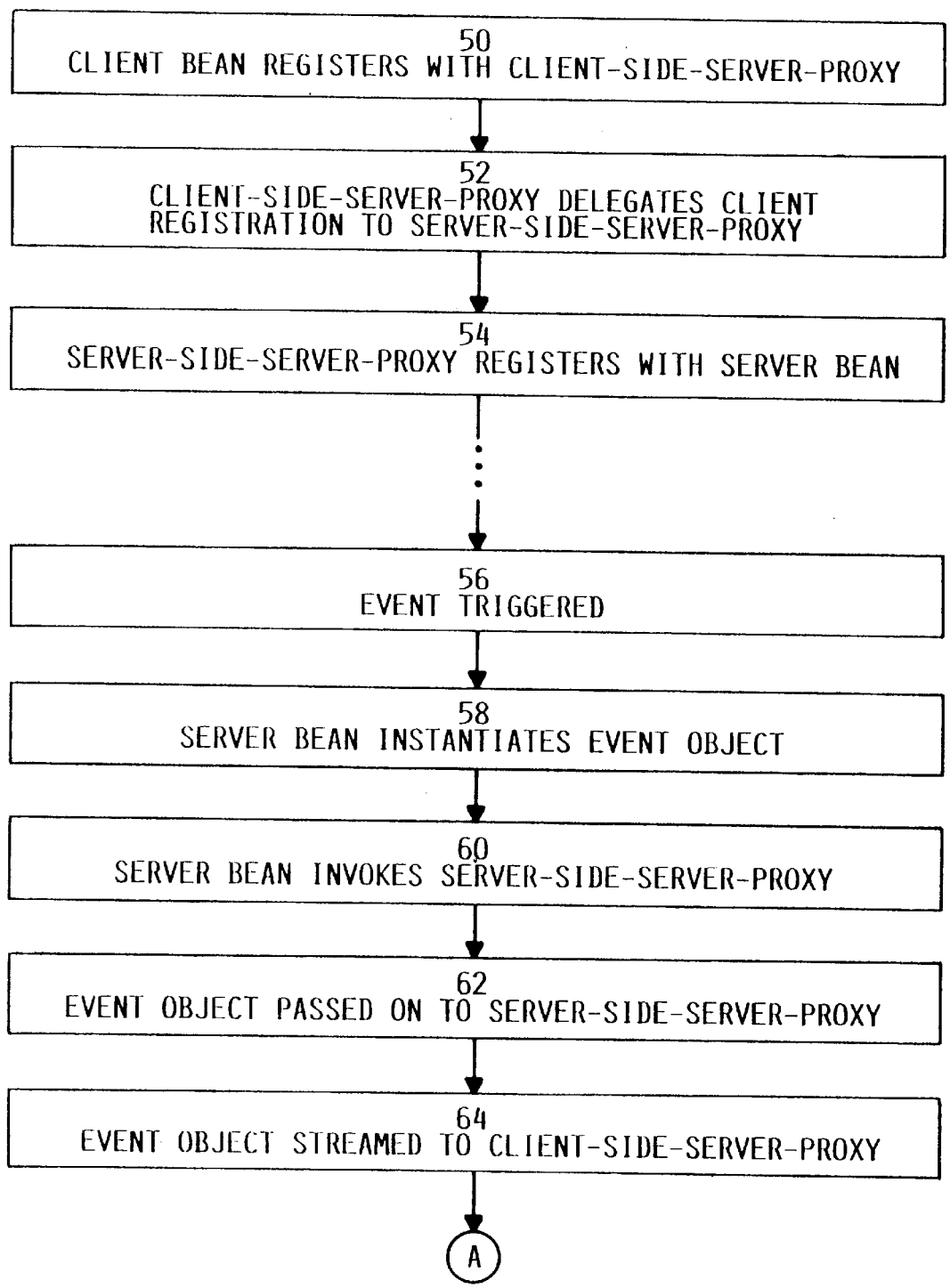
FIG. 2B-I

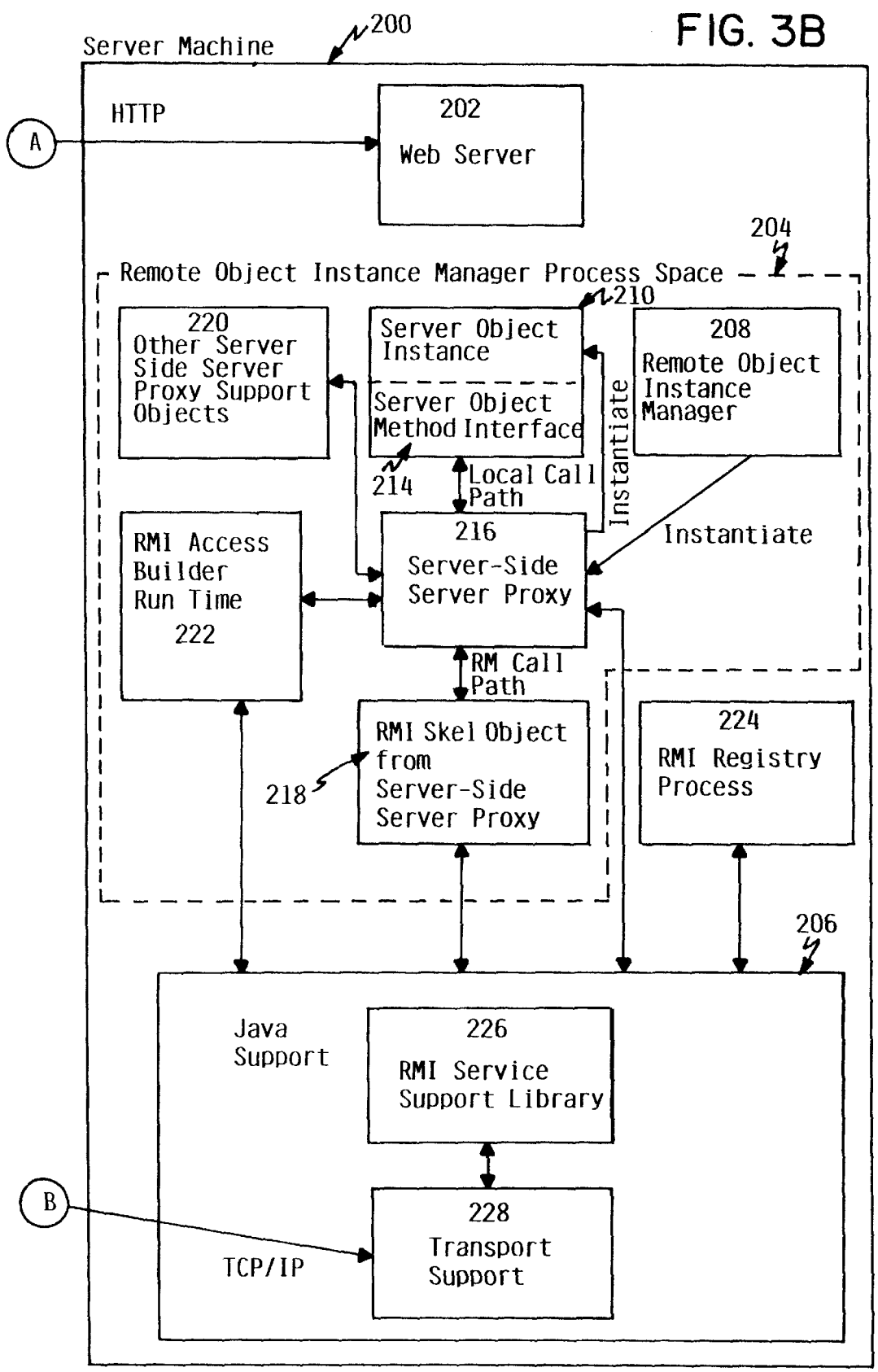

Start connection from IReverseII.

| Method |
|---|
| addPropertyChangeListener |
| (java.beans.PropertyChangeListener) |
| equals(java.lang.Object) |
| Get parent Component |
| Get RMI Registry port setting |
| Get Server Host IP Name |
| Get Trace State |
| getClass() |
| getUsageCount() |
| hashCode() |
| notify() |
| notifyAll() |
| removePropertyChangeListener |
| (java.beans.PropertyChangeListener) |
| ReverseI() |
| reverseMethod(java.lang.String) |
| Set parent Component |
| Set RMI Registry Port number |
| Set Server TCP/IP Name |
| Set Trace State |
| setUsageCount(java.lang.String) |
| toString() |
| wait() |
| wait(long) |
| wait(long,int) |

| Property | |
|---|---|
| class | R |
| parent component | RW |
| RMI Registry Port Number | RW |
| Server Host IP Name | RW |
| this | RB |
| Trace | RW |
| usageCount | RWB |

| Event | |
|---|---|
| propertyChange | |
| propertyChange | |
| (java.beans.PropertyChangeEvent) | |
| this | RB |
| usageCount | RWB |

FIG. 4B-1

CREATING PROXIES FOR DISTRIBUTED BEANS AND EVENT OBJECTS

FIELD OF THE INVENTION

This invention relates generally to the development of distributed applications, and in particular, provides a tool for generating distributed middleware for use in a platform independent programming environment, such as Java™.

BACKGROUND OF THE INVENTION

Object oriented (OO) technology is based on the notions of "object" and "class inheritance". An object is a reusable software package that is an instance of a class. The class provides the definition for a set of operations that can be performed on the object and other objects that are instances of the same class. Classes can be related to one another by inheritance, and the properties, behaviours, data and operations of a parent or "base" class (a class without member objects), may be inherited with or without modification in the derived class under the control of a programmer.

Java is one of the newest OO languages. Partially pre-compiled Java code, in the form of bytecode, can be run in the Java virtual machine. Bytecode has been found to be particularly suitable for network transmission. Thus, Java is seen as a primary environment for developing Internet applications, that is, applications referenced on web pages and intended to be down loaded and run at a remote computer.

Sun Microsystems, Inc., the originator of the Java programming language, has developed a Java operating system and development environment (the Java Developer Kit). Emphasizing the code reusability aspects of OO programming, Sun has also developed a software component model, which it refers to as JavaBeans™. According to the Sun JavaBean tutorial "Using the Beans Development Kit 1.0" (February 1997), a "bean" is a Java class which adheres to certain property and event interface conventions. Properties are the public attributes of a class. Conceptually, events are a mechanism for propagating state change notifications between a source object and one or more target objects that have registered with the source object as "listeners" of occurrences of the event. For example, the event scheme of JavaBeans could be used to notify several client beans when the state of certain data is changed in a database. This notification could be used to trigger method invocations by some of the listening clients.

The design of bean interfaces, properties, access methods to properties and events are set out in Sun's JavaBean 1.0 API Specification. The JavaBean software model includes a service called "introspection" that allows beans to be inspected at a low level to determine the class content and, at a high level, to define the properties, methods and events in the class. Introspection operates using the naming conventions required in the specification for programming beans. Thus, classes programmed following the JavaBeans design pattern will provide enough information in a JavaBeans framework to describe what the bean contains and how to use it.

The JavaBeans software component model allows beans to interact with one another in the manner described in greater detail below. Beans may be manipulated in a visual builder tool and composed together into applications.

As discussed in U.S. Pat. No. 5,457,797 titled "Flexible Multi-Platform Partitioning For Computer Applications" of Forte Software Inc., the dual trends in computer development of placing increasingly powerful processors in workstations in personal computers (PCS) coupled with rapidly improving connectivity has permitted the development of distributed applications. Distributed applications refers to the paradigm in which software elements that must cooperate to fulfill the purpose of an application or have completed a transaction spread over multiple parallel processors. One advantage of this is that applications requiring substantial support from other applications can be run over a network of linked workstations or PCS, each with modest memory and processing capacity, rather than requiring a very large computer to run the application and all of its dependencies. The advantages of distributing applications is also discussed in Canadian Patent Application Serial No. 2,165,893, titled "Visual Application Partitioning for Creating Distributed Object Oriented Applications", which is commonly assigned (IBM Docket No. CA9-95-014).

Distribution, then, is the process of creating a remote access mechanism for a program object where some or all of the functions and characteristics of the original object are made available remotely on another machine in a separate program. Both the Forte patent and the earlier IBM application discuss schemes for effecting application partitioning. In the IBM application, a visual partitioning tool permits the user to design the distribution schema and select the middleware properties for each distributed connection. The tool then generates the client and server stubs for all of the distributed connections represented in the distribution schema.

Another way to represent remote objects locally is through the use of "proxies". An early approach to the use of proxies is found M. Shapiro, "Structure and Encapsulation of Distributed System: The Proxy Principle", proceedings of Six International Conference of Distributed Computer Systems, May 1986, Pages 198–204, where proxies are described as being of the nature of "stubs" introduced as interfaces between clients and services.

In object oriented technology, proxies are often used to enable access to remote objects transparently, so that the interface of the proxy accessible to the client is indistinguishable from a similar interface of the actual implementation. This "local-remote transparency" allows the use of a consistent programming style in the client, and permits common code to deal with both local and remote objects. IBM's DSOM and IONA Orbix which conform to the Object Management Group's Common Object Request Broker Architecture, CORBA, are examples of this use of proxies. These environments also offer symmetry in that a mixture of implementation in proxies can exist on both side of a remote connection. The use of proxies enables the support of complex interfaces involving complicated data types, exceptions, and inheritance.

Just as it may be desirable to distribute large non-Java applications over several servers, the same is becoming increasingly important in platform independent programming environments like Java, as users think of these environments more and more as productive working environments.

However, the current JavaBeans component model does not address component distribution. Rather, it is a user's choice to distribute bean functions using the existing object distribution protocols. The object distribution protocol developed by Sun for use in the Java environment is a communications support utility with a remote call paradigm called remote method invocation (RMI). RMI is a service provided as part of the Java Development Kit version 1.1.1.

It allows methods in Java objects be invoked from another Java program running in a machine process across a network. It is a similar paradigm to remote procedure calls (RPCs) used in the distributed computing environment (DCE) of the Open Software Foundation. A full description of RPC technology can be found in "Introduction to OSF™ DCE", 1992, of Open Software Foundation.

The difficulty with RMI is that the user must define the interfaces for the client and server stubs. It can be quite difficult to seamlessly integrate distribution-specific code, often called middleware, with the non-distributed, application-specific code typically contained in a bean. Application writers are usually familiar with specific application domains, and they specifically do not want to mix the distribution logics and application domains specific logics together.

SUMMARY OF THE INVENTION

It is therefore an object of the present invention to provide a mechanism for distributing applications comprised of JavaBean components, or software components of other platform independent programming environments, which still leaves access to the methods, properties and events in a given bean.

It is also an object of the invention to provide a code generation tool that takes a bean, a software component containing only application domains specific logic, and generate appropriate middleware proxies for use of the bean in a distributed application.

Therefore, the present invention is directed to a mechanism for use in a distributed object oriented programming environment, to provide access to a server object in a first domain containing domain-specific logic for remote method invocations and state information notifications. The mechanism consists of a first proxy located in the first domain having middleware-specific logic to transmit and receive method invocations and state information notifications over the distributed environment, and an interface to interact with the server object as a local client program, a second proxy located in a remote domain with a client program, the second proxy having middleware-specific logic to transmit method invocations and receive state information notifications over the distributed environment, and having an interface to interact with the client program as a local server object, means to instantiate a proxy object in the second proxy for an instance of state information notification received from the server object through the first proxy and the middleware, said proxy object identifying the second proxy as source of the instance of state information notification, and means to transmit the proxy object to the client program.

Preferably, the second proxy has interfaces identical to interfaces in the server object, so that the client program will interact with the second proxy as a local copy of the server object.

The invention also provides a code generation tool for generating proxy classes from a domains-specific server object for remote method invocation on the server object and communication of state information from the server object over a distributed object oriented application. The code generation tool is adapted to generate an event proxy for each item of state information communicable by the server object, a first proxy for deployment with the server object and adapted to provide a communication interface for method invocations from remote clients on the server object and for state information communications from the server object to communications middleware in the distributed object oriented application, and a second proxy for deployment with a client program remotely from the server object. The second proxy is adapted to:

(a) provide a communications interface for method invocations on remote servers from the client program to the communications middleware, (b) instantiate an event proxy object from the event proxy for each item of state information communicated from the server object through the first proxy, and (c) communicating the event proxy object to the client program.

Preferably, the code generation tool is adapted to generate the event proxy as farther including means to create a delegation service from the event proxy object instantiated by the second proxy to the item of state information, so that data on the state information item requested by the client program can be retrieved.

BRIEF DESCRIPTION OF THE DRAWINGS

Embodiments of the invention will now be described in detail in association with the following drawing, in which.

DETAILED DESCRIPTION OF THE PREFERRED EMBODIMENTS

Figure 1A:
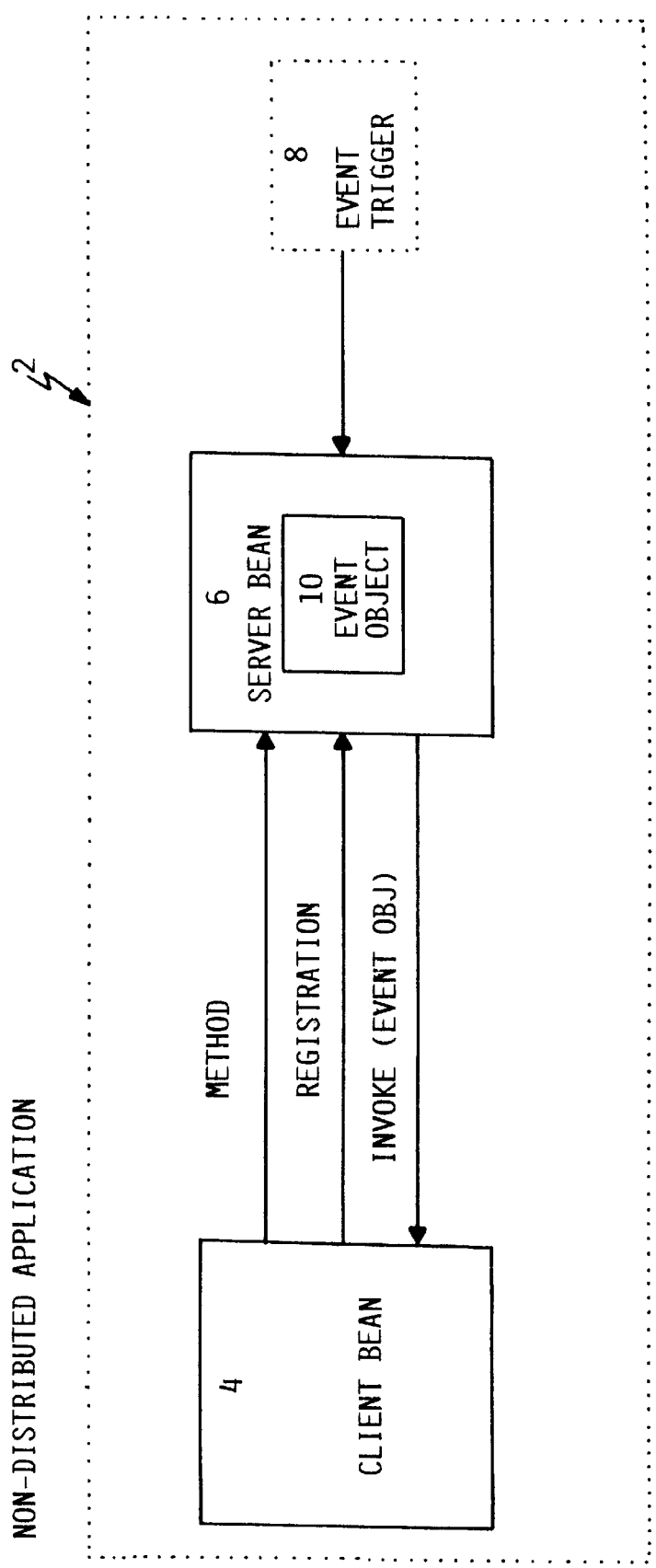
FIG. 1A schematically illustrates method invocation and event notification between "beans" (Java classes) in a non-distributed application.
Figure 1B:
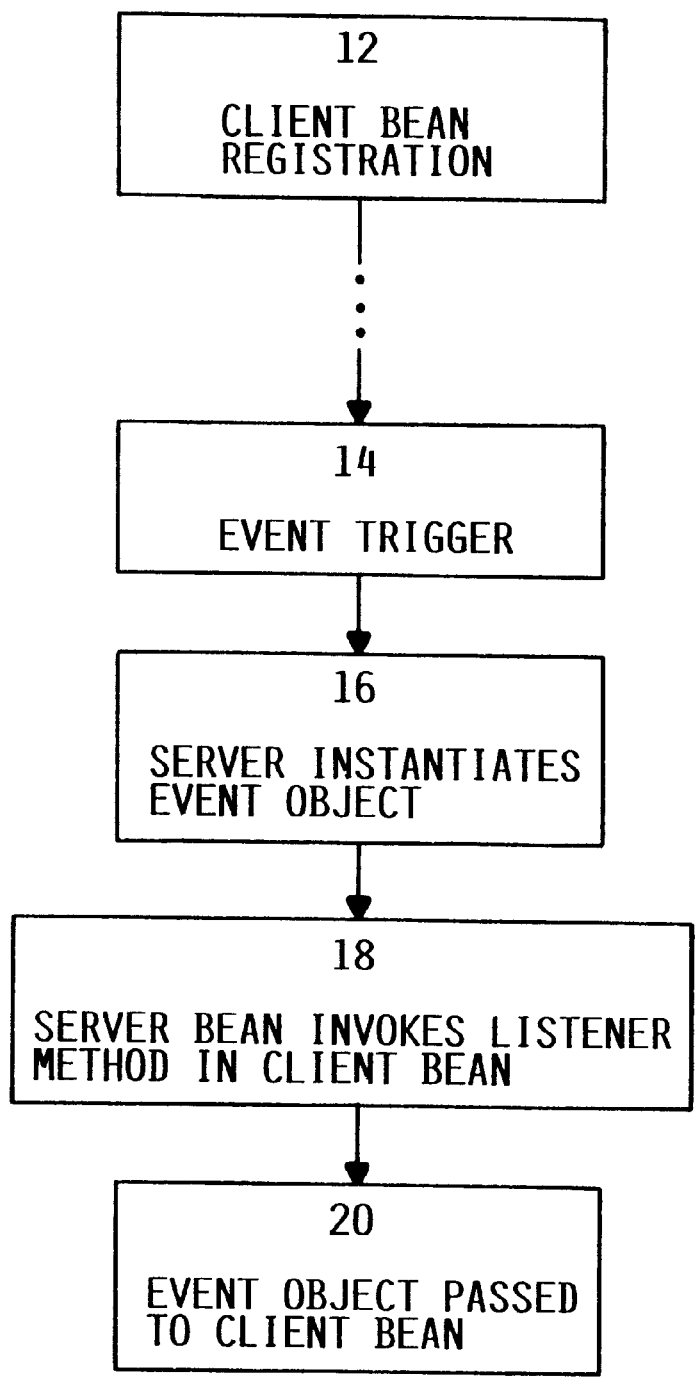
FIG. 1B is a flow diagram setting out the steps for event notification between non-distributed beans, as illustrated in FIG. 1A.

As discussed above, beans are Java classes that follow the design pattern set out in the JavaBean 1.0 API Specification for naming objects and interfaces in the class. FIGS. 1A and 1B are based on the convention for programming events and listener registration provided in the JavaBeans specification. FIG. 1A shows a non-distributed application 2, that is, an application in which all of the software components reside on a single process. The client and server beans 4 and 6 are instances of object oriented classes (in Java). The client bean 4 can invoke a method on a server bean 6 in the usual way. In addition, the server bean 6 can instantiate event objects 10 in response to event triggers 8 represent some change in state information. The instantiated event object 10 contains the state information that a user may want to pass from the server bean 6 to one or more target client beans 4. FIG. 1B sets out the steps of the event notification scheme in this local environment.

The client bean indicates to the server bean that it is interested in an event by registration (block 12), that is by implementing a "listener" interface. In a JavaBeans framework, this is done by calling the "add<EventClassName>Listener" method. Client's registration as a listener of an event is done some time before the event is triggered for the listener to receive event notification.

After an event trigger is received at the server bean (block 14) and the server bean determines that an event object should be "fired", the server bean instantiates the event object (block 16). The event object is defined by the "EventClassName" referred to above. The event includes an identification of the server bean that instantiated and fired it, "Event[SRC]", so that the client bean that receives the event object can identify the source of the event.

The server bean "fires events" by invoking listener methods in the registered client bean (block 18). The event is now passed to the client bean (block 20) since the client bean implements the methods defined in the event's listener interface.

Figures 1, 2A:
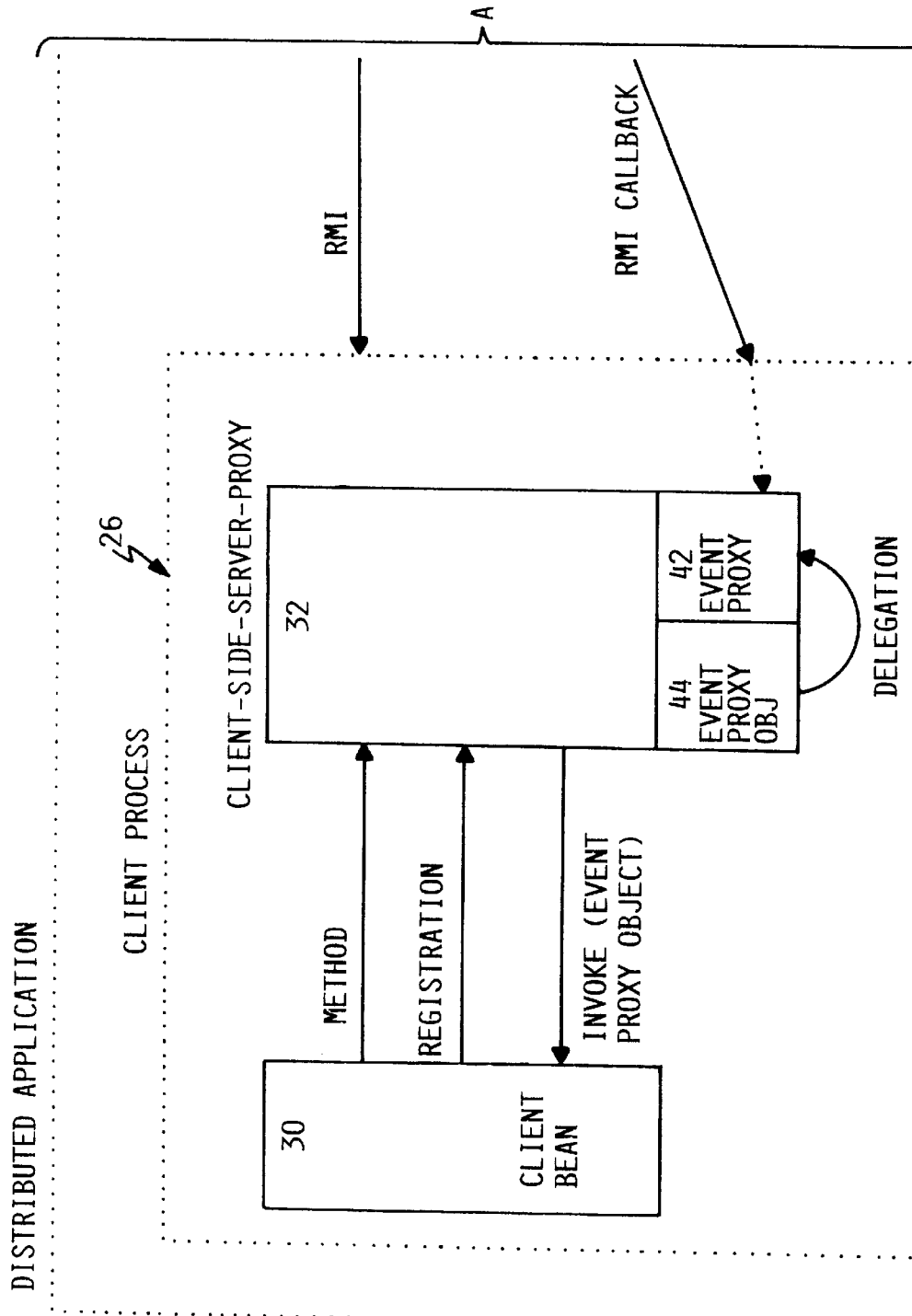
FIG. 2A is a view similar to FIG. 1A, that schematically illustrates method invocation and event notification between beans in a distributed application, according to the invention.
Figures 2, 2A:
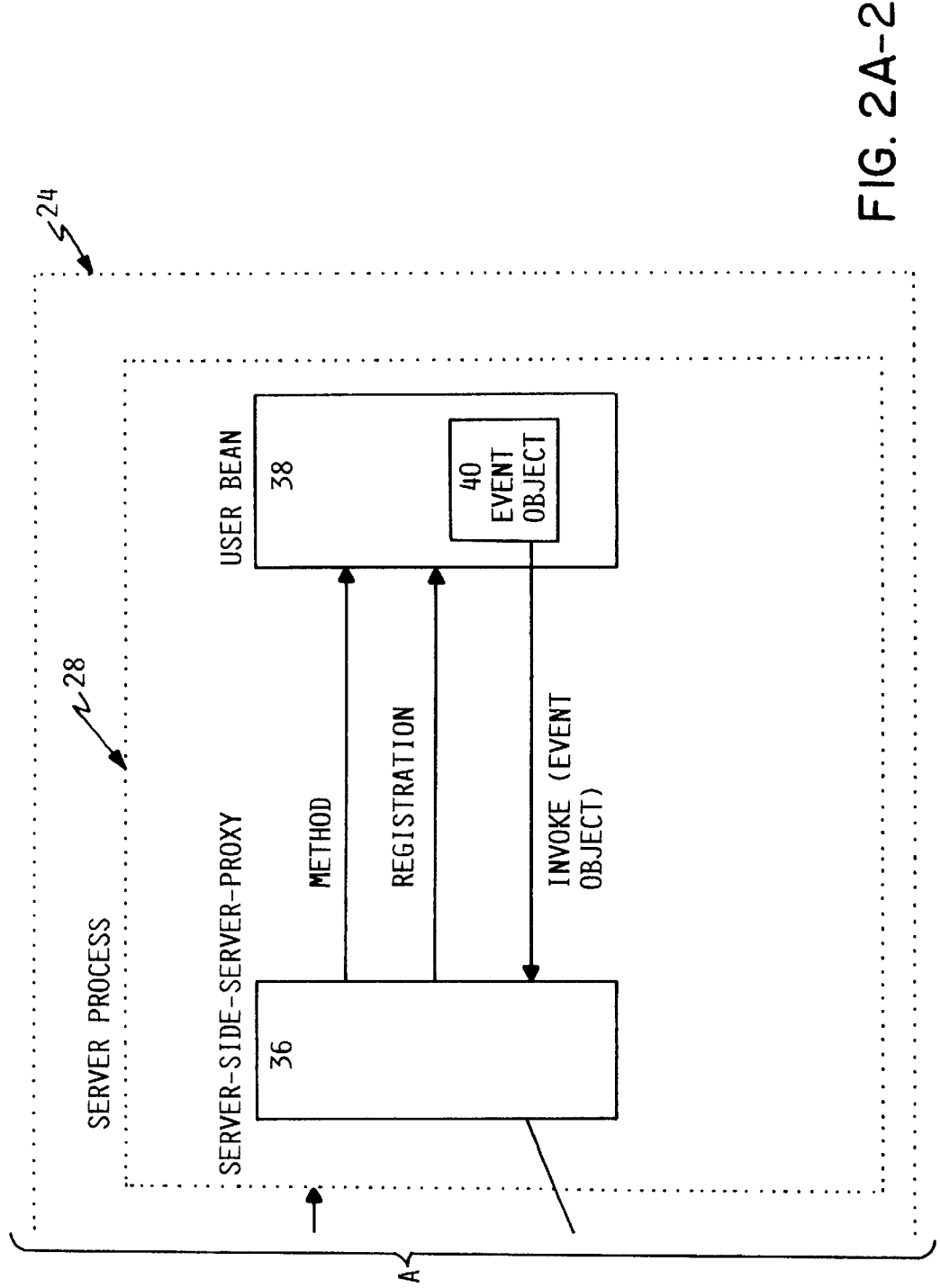

FIG. 2A illustrates, abstractly, the manner in which the client and server beans can be distributed, according to the invention. In creating a distributed application, the user typically wants to access methods and events of a server bean 38 as if the server bean were local, from a Java client bean 30 running on a different machine. In its preferred embodiment, the invention provides an environment in which the processing of JavaBeans events follow the design pattern described in the JavaBeans specification over a cross-machine environment where listeners of events are located in another process space across a network. According to the invention, this is accomplished by recreating the interfaces and events generated by the remote server process, inside the client process. Such a model frees the programmer from having to know how to work with the middleware specific code.

In the preferred embodiment, a code generation tool implemented for a Java programming environment is provided to generate all necessary "interfaces" to permit a distributed application to be created. The input to the code generator is the server bean which has been written by the user for the purpose of solving some user specific problem. The output is a number of proxy classes which permit the local listening and event firing activities, as well as method invocation, between the client and server beans to be emulated over a distributed environment.

Under the JavaBean programming model, the server bean has a method interface through which services can be made by invoking those methods. However, the use of any bean in its original form is limited to the single system where the bean is instantiated and executed. The code generator makes use of the Java Introspection APIs to query interface information of the server bean. Knowing what public methods and events the server bean provides, the code generator generates:

1. a client-side-server-proxy;
2. a server-side-server-proxy; and
3. an event proxy for each event in the server bean.

Other interfaces and classes generated to support these three key classes will be obvious to the person skilled in the art from reviewing the remainder of this disclosure and accompanying drawings. The preferred embodiment discussed herein relates to supporting interfaces and classes in the Java programming environment with RMI middleware. The different requirements for other programming environments with method invocation and state information notification mechanisms will be obvious to those skilled in the art.

The client-side-server-proxy is a representation of the server bean that will continue to exist on the client side once the server bean is remotely distributed, and will be used in method access and event generation activities. These activities will appear to be carried out locally, but will actually be carried out remotely on the server system. In essence, the client-side-server-proxy and its supporting code (discussed below) acts as a bridge between a client Java bean and the server bean without requiring the user to know how to use the communication services running between the different computer systems.

In order to create the client-side-server-proxy, the following interface information is analysed from the server bean and used in producing the client-side-server-proxy and its supporting classes:

(i) All public methods provided by the server bean. For each public method found in the server bean, an identical method will be found in the client-side-server-proxy so that client bean can access the client-side-server-proxy as if it is the server bean itself; and (ii) Events generated by the server bean. All event listeners that the server bean may interact with are identified through the analysis of the server bean interface and all event objects that can be produced by the server bean are noted by the code generator. This information is also used in generating the event proxy class for each identified event.

The client-side-server-proxy also contains the distribution classes required to distribute the server bean over the given middleware or communication mechanism. In the case of the preferred embodiment, this communication mechanism is the Java RMI services.

The event proxy is a sub-class of the corresponding event, and it will have all the public event methods found on the original event for access by clients. It is used in the client-side-server-proxy for instantiating an event proxy object when an event associated with the event object must be passed to the client bean.

The server-side-server-proxy is generated independently of the client-side-server-proxy, when the analysis of the server bean is complete. It is a companion class to the client-side-server-proxy that will act as a generic listener on the server side for all events fired by the server bean once the server bean has been deployed remotely. The server-side-server-proxy is to be instantiated in place of the server bean when server system communication services have been started, but before the client-side-server-proxy is put to use in client applications.

Once the client-side-server-proxy has been generated and used to create the Java client program or bean, the application specific server bean can be deployed as a server bean on a remote server, where it will be instantiated by way of instantiating the server-side-server-proxy, and create event objects in the normal manner, as required, to fulfill methods invoked on it.

FIG. 2A illustrates the deployed software components in a distributed application 24 which includes a client process 26 and a separate (distributed) server process 28. The client bean 30 invokes methods and registers as a listener of events with a client-side-server-proxy 32 which is generated to include the interfaces of the remote server bean 38, such as the add and remove event listener interfaces, while executing in the client's process space 26. The server bean 38 is unchanged in its logic, and is located on the server side along with a server-side-server-proxy 36 which is generated to act as the event listener (in place of the client bean 30) for the events 40 generated by the server bean 38. On an event occurrence for which the client bean 30 is registered, the two proxies, the client-side-server-proxy 32 and the server-side-server proxy 34, cooperate to create the event in the client side and to transparently handle the communications interfaces. This is illustrated following the steps set out in the flow diagram of FIG. 2B.

In order for a client bean to register its interest in an event of a remote server bean event, the client bean registers itself as a listener of the event with the client-side-server-proxy (block 50). The client-side-server-proxy delegates this interest to the server bean via the server-side-server-proxy (block 52). This causes the server-side-server-proxy to become a registered listener for the event in the server bean event (block 54), so that when events are fired by the server bean, the server-side-server-proxy will be notified and, in turn, the client-side-server-proxy will be passed the event object.

Thus, when an event is triggered (block 56) and the server bean instantiates the event object (block 58), the server bean invokes the server-side-server-proxy (block 60) and passes to it the event object (block 62). The event object is "streamed", that is copied, from the server-side-server-proxy to the client-side-server-proxy (block 64).

The listener registration and event firing schemes described above exploit RMI Callback protocols so that the asynchronous nature of the JavaBeans events are preserved.

When the client-side-server-proxy receives the event object invocation, it instantiates an event proxy object through the event proxy class for that event (block 66). The event proxy object has its event source in the client-side-server-proxy, and the sole purpose of the event proxy object is to introduce this override in the event source information so that the client bean identifies the proxy on the client side of the distributed application as the source of the event for future calls. The event proxy object contains no data and uses a delegation scheme to interact with the event object in order to permit the server bean's event state information to be retrieved through the event object's accessors methods. This delegation is schematically illustrated in FIG. 2A.

The client-side-server-proxy invokes the client bean (block 68 of FIG. 2B) and passes to it the event proxy object (block 70).

Upon completion of event processing on the client side of the application, control is returned to the server bean (block 72).

Figures 2, 2B:
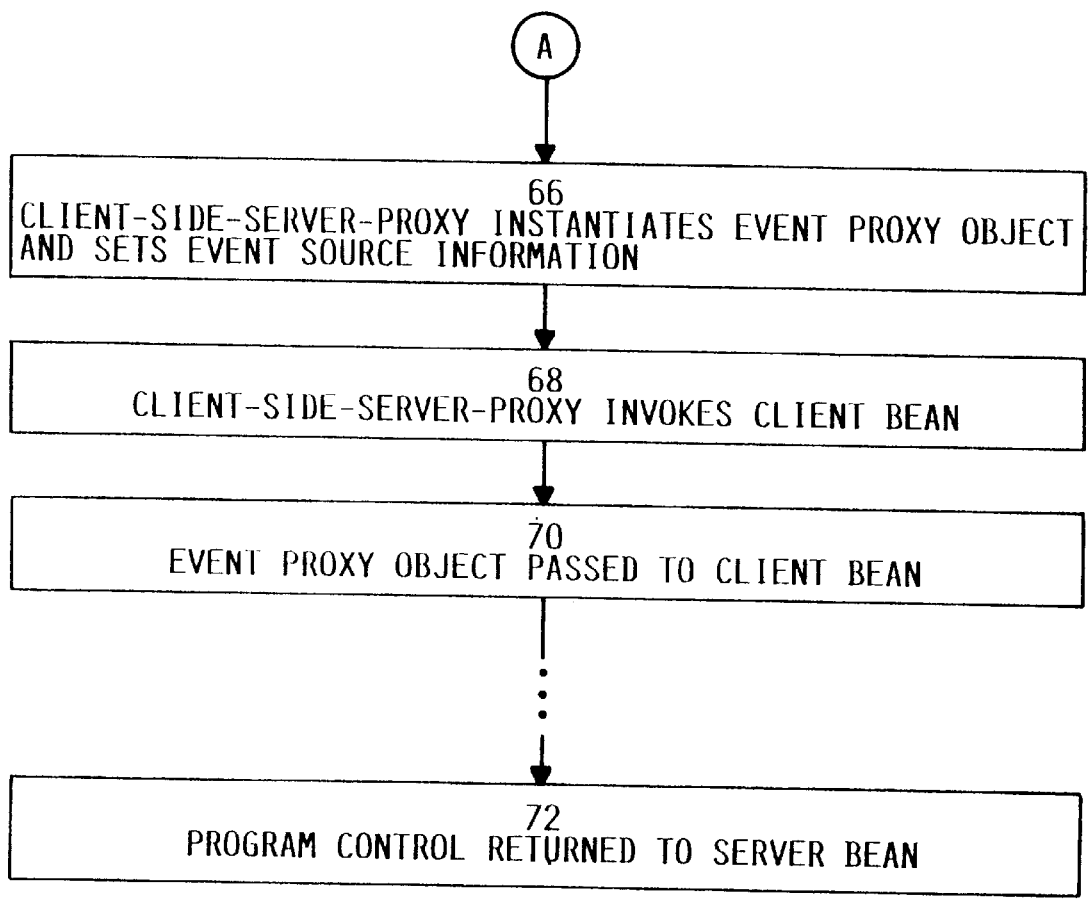
FIG. 2B is a flow diagram setting out the steps for event notification between the distributed beans shown in FIG. 2A, according to the invention.
Figure 3A:
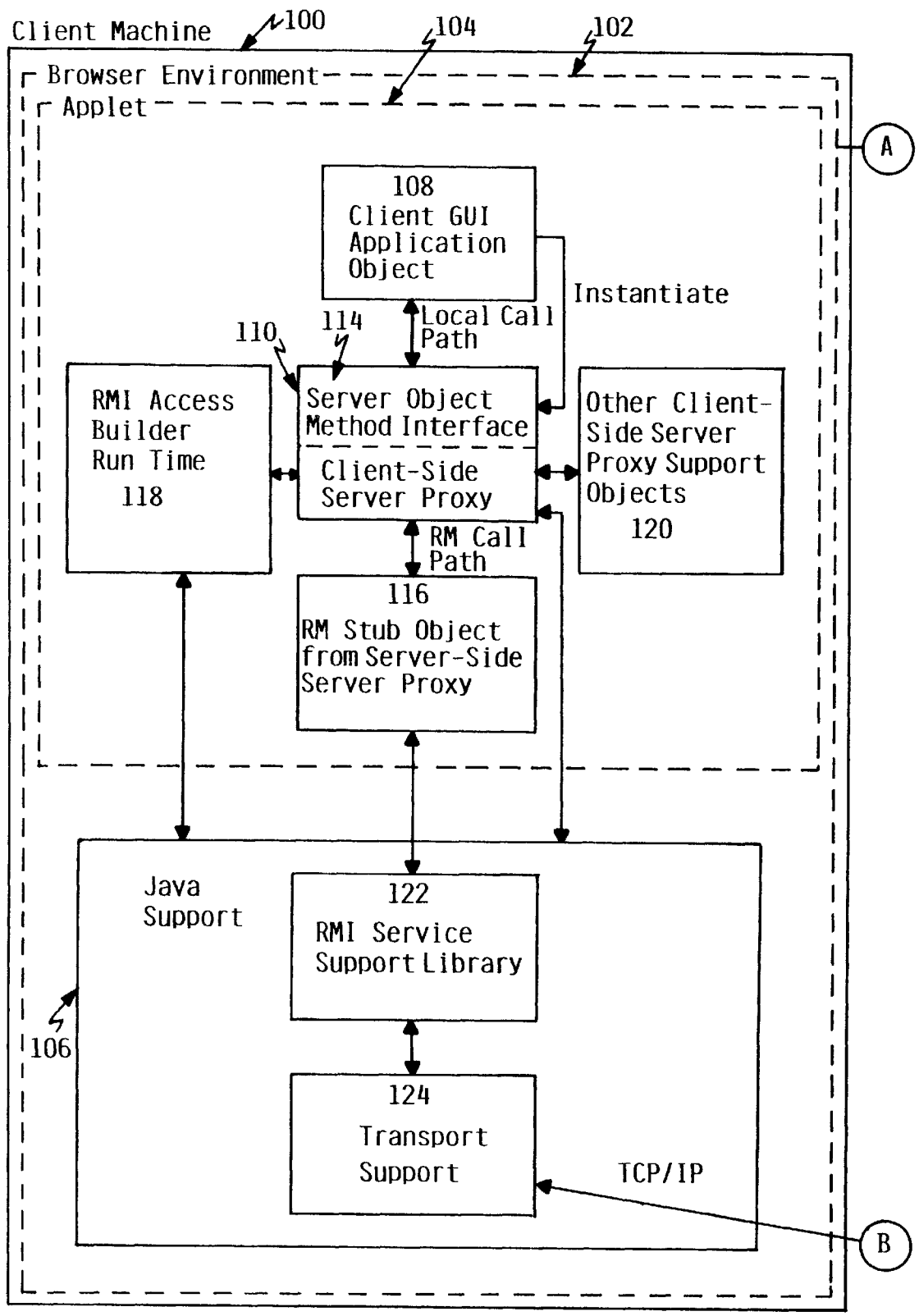
FIG. 3 schematically illustrates the preferred embodiment of the invention implemented in association with the Java RMI communication services.

FIG. 3 shows a specific implementation of the remote access scheme of FIGS. 2A and 2B in a Java environment distributed over the Internet and supported by the RMI communications services.

In FIG. 3, the client-side machine and the objects residing on it are generally designated by 100, while the server-side machine and objects residing on it are generally designated by 200.

The form of the client machine 100 is a browser environment 102 that permits Internet access. For example, the location of the server machine 200 can be easily ascertained through a hypertext (HTTP) link to web server 202.

Within the client-side browser environment 102 is the local program or applet 104 and the Java Support 106 providing communications support services. The communication support services in the Java Support 106 include the RMI service support library 122, which is provides the RMI runtime support, and the TCP/IP transport support mechanism 124.

The applet 104 contains a client object 108 which includes a graphical user interface (GUI) component, a client-side-server-proxy 110 and the interfaces required to support remote event creation in this environment.

This is mirrored in the server machine 200 by the Remote Object Instance Manager 204 containing a server bean 210, server-side-server-proxy 216 and other interfaces supporting the distributed environment, and the Java Support 206. Like its counterpart on the client side 106, the Java Support 206 on the server side contains a the RMI service support library 226 and the TCP/IP transport mechanism 228.

Using a code generator of the type described above, the client-side-server-proxy 110 on the client machine 100 side has been generated for execution in any Java execution environment that provides the RMI services. The name of this proxy is supplied by the tool user. It includes the server bean method interface 114, which is a copy of the server object method interface 214 in the server bean 210, and from which the behaviour and services of the server bean 210 can be accessed and modelled remotely over a network.

Figure 4A:
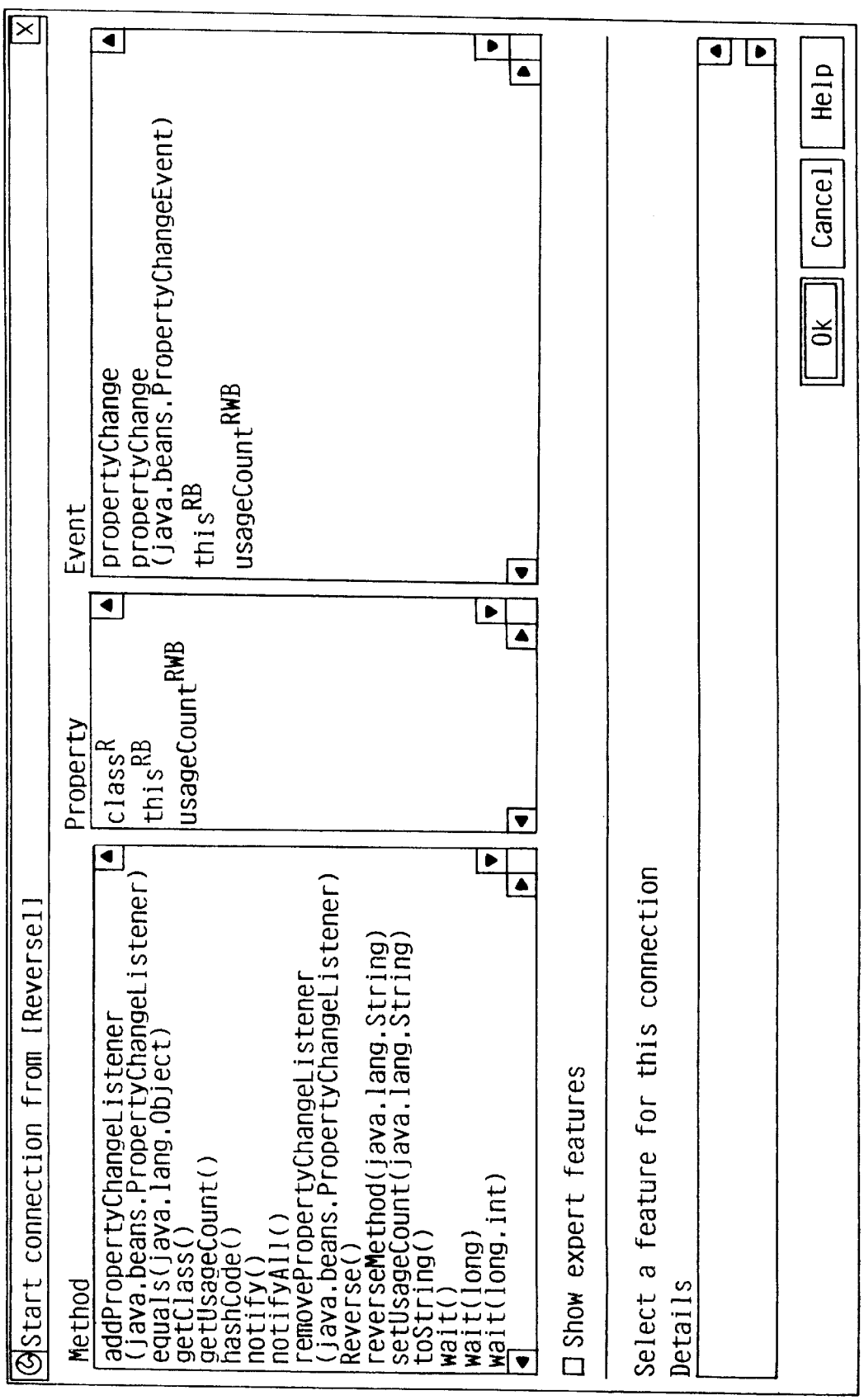
FIG. 4A is a screen view in a visual builder listing the methods, properties and events in a server "bean" that is the source of events.
Figures 2, 4B:
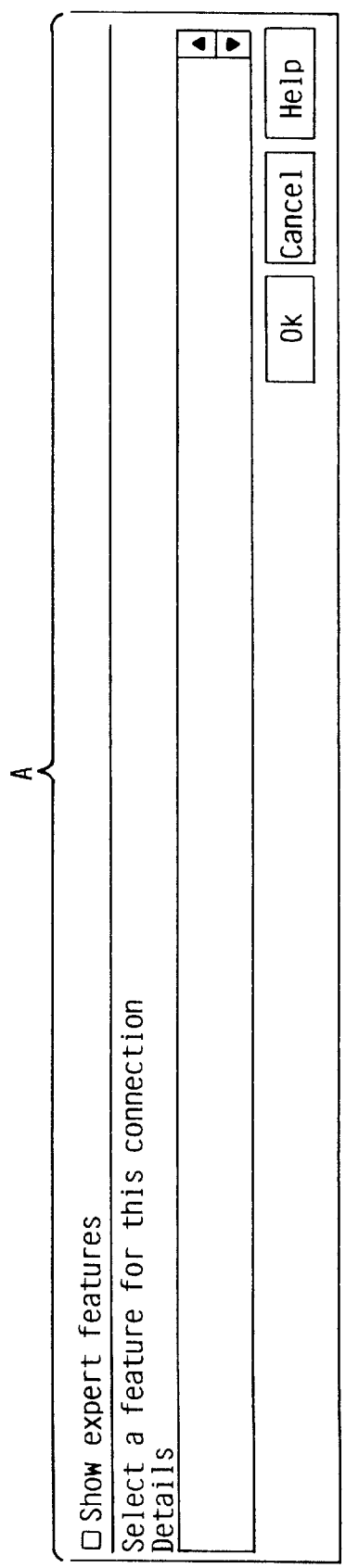
FIG. 4B is a view in a visual builder listing the methods, properties and events in a client-side-server-proxy for the bean of FIG. 4A generated by a code generation tool, according to the preferred embodiment of the invention.

FIG. 4A is a window view from a visual building tool listing the methods, properties and events programmed for a server bean of the type discussed herein. FIG. 4B is the same type of view of the list of methods, properties and events of a client-side-server-proxy generated from the server bean by the code generator of the preferred embodiment. As can be seen by comparing the content the lefthand column titled "Method" in each Figure, the proxy class encapsulates all of the methods of its original bean class, and adds additional methods, such as "Get RMI Registry port setting" to specifically support remote access for a client to the original bean.

The client-side-server-proxy contains all the public methods defined by the server bean, as shown by comparing the middle column titled "Property" in FIGS. 4A and 4B. These lists are identical.

Additionally, if the original server bean produces Java events, the client-side-server-proxy will produce events in much the same way, as shown in the right hand columns titled "Events" in FIGS. 4A and 4B. These lists are again are identical.

The server-side-server-proxy 216 has the same name as the client-side-server-proxy 110 except that a suffix "S" is appended. This is a Java class that supports the function needed by the client-side-server-proxy 110 in the server machine. Specifically, the server-side-server-proxy 216 wraps a layer of communication protocol over top the server bean 210 such that the client-side-server-proxy 110 can access the server bean 210 through the server-side-server-proxy 216 using the Java RMI services for method invocation, to register the client bean 108 as a listener of events in the server bean 210 and to receive event notifications.

To optimize code size and promote code reuse, the client-side-server-proxy makes use of the RMI Access Builder Run Time class library 118.

The interface of the server-side-server-proxy (not shown) takes the Java bean proxy 110 name as the root name followed by a suffix "If". This interface is generated such that the proxies generated can use the Java RMI services to carry out the remote communication over a network. The interface defines what server bean public methods are made accessible through the client-side-server-proxy 110 and by way of the server-side-server-proxy.

The RMI Access Builder Run Tim 222 class library is used by the server-side-server-proxy to reduce the amount of generated code by promoting code re use.

Client-side-server-proxy RMI interfaces (not shown) are only generated when the server bean 210 is a producer of Java events. The name of this interface is produced by concatenating the name of the client-side-server-proxy 110 and the suffix "RmiIf".

The Remote Object Instance Manager 208 is a generic object instance manager for server-side-server proxies generated by the subject code generation tool. At execution time, server beans may need to provide long running services. Consequently, in the preferred embodiment, the Server-side-server-proxy 216 is instantiated in a long running process, such as the Remote Object Instance Manager 208. The server bean 210 is then instantiated by the server-side-server-proxy 216 which creates a long-running instance of the server bean 210.

Since events flow from the server bean 210 back to the using client bean 108 through the client-side-server-proxy 110, the client-side-server-proxy 110 will need to identify itself as an event source.

When the server bean is an event producer, the generated client-side-server-proxy 110 will also be an event producer. For each event type produced by the server bean 210, a corresponding event proxy type (not shown) is generated by the code generator for use by the client-side-server-proxy 110. For every event object sent by the server bean, a corresponding event proxy object will be generated and sent by the client-side-server-proxy back to the listeners for the event on that system, including the client bean 108. State information saved in the event generated by the server bean can be retrieved through the event proxy object via method invocations in the same way as if the event proxy object is the event object itself.

The Java RMI service and the RMI Registry 224 that are provided as part of the Java execution environment provides the foundation for all remote network communication required by the client-side-server-proxy 110 and its supporting classes. Java RMI service tools will need to be used on the generated code to further generate the so called "Stub" 116 and "Skeleton" 218 classes to facilitate communication. These are described in detail in JavaBeans Remote Method Invocation Specification.

The following limitation should be observed in the environment of the preferred embodiment, that is, the Java RMI. In general, server objects may reside as instances on different server machines. However, because of security constraints imposed by the RMI protocol, an applet can only access server object instances running on the host from which the applet code is downloaded. In addition, failure of the RMI Callback due to security constraints will affect proper functioning of the event proxy distribution position.

Modifications to the invention which would be obvious to the person skilled in the art are intended to be covered in the scope of the appended claims.

What is claimed is:

1. In a distributed object oriented programming environment, a mechanism to provide access to a server object in a first domain containing domain-specific logic for remote method invocations and state information notifications, comprising:

a first proxy located in the first domain having middleware-specific logic to transmit and receive method invocations and state information notifications over the distributed environment, and an interface to interact with the server object as a local client program;

a second proxy located in a remote domain with a client program, the second proxy having middleware-specific logic to transmit method invocations and receive state information notifications over the distributed environment, and having an interface to interact with the client program as a local server object, means to instantiate a proxy object in the second proxy for an instance of state information notification received from the server object through the first proxy and the middleware, said proxy object identifying the second proxy as source of the instance of state information notification; and means to transmit the proxy object to the client program.

2. The mechanism, according to claim 1, wherein the second proxy has interfaces identical to interfaces in the server object, whereby the client program interacts with the second proxy as a local copy of the server object.

3. The mechanism, according to claim 1, wherein the means to instantiate the proxy object further include means to generate a delegate in the proxy object to the instance of state information, whereby the proxy object provides an interface for requests from the client program for data on the instance and responses from the instance to said requests.

4. A code generation tool for generating proxy classes from a domains-specific server object for remote method invocation on the server object and communication of state information from the server object over a distributed object oriented application, the code generation tool being adapted to generate:

an event proxy for each item of state information communicable by the server object;

a first proxy for deployment with the server object and adapted to provide a communication interface for method invocations from remote clients on the server object and for state information communications from the server object to communications middleware in the distributed object oriented application; and a second proxy for deployment with a client program remotely from the server object, and adapted to:
   (a) provide a communications interface for method invocations on remote servers from the client program to the communications middleware,
   (b) instantiate an event proxy object from the event proxy for each item of state information communicated from the server object through the first proxy, and
   (c) communicating the event proxy object to the client program.

5. The code generation tool, according to claim 4, adapted to generate the event proxy as further including means to create a delegation service from the event proxy object instantiated by the second proxy to the item of state information, whereby data on the state information item requested by the client program can be retrieved.

6. The code generation tool, according to claim 4, adapted to generate the second proxy with interfaces identical to the server object.

* * * * *